May 15, 1962

B. L. FRIEDMAN 3,035,219

ELECTRONIC FLASH UNIT

Filed July 17, 1957

2 Sheets-Sheet 1

INVENTOR.
BERNARD L. FRIEDMAN.
BY EZEKIEL WOLF
HIS ATTORNEY.

May 15, 1962 B. L. FRIEDMAN 3,035,219

ELECTRONIC FLASH UNIT

Filed July 17, 1957 2 Sheets-Sheet 2

INVENTOR.
BERNARD L. FRIEDMAN.
BY EZEKIEL WOLF
HIS ATTORNEY.

3,035,219
Patented May 15, 1962

3,035,219

ELECTRONIC FLASH UNIT

Bernard L. Friedman, Waban, Mass., assignor, by mesne assignments, to The Indikon Company, Inc., Watertown, Mass., a corporation of Massachusetts Filed July 17, 1957, Ser. No. 672,501
16 Claims. (Cl. 320—1)

Figure 2:
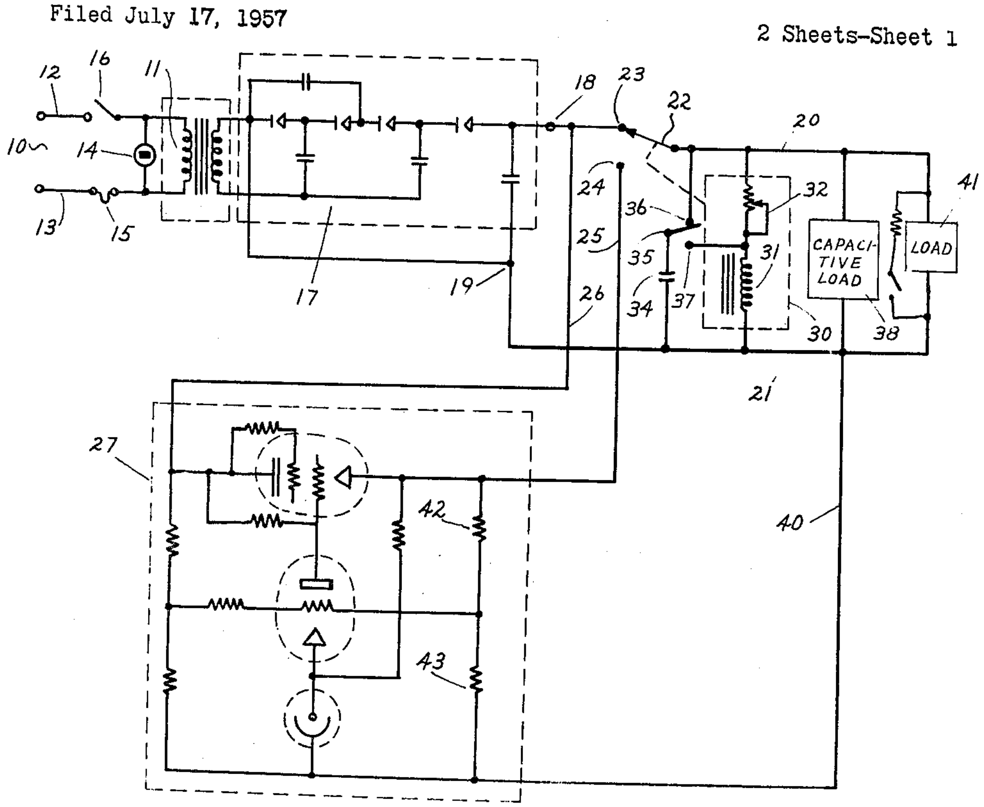

The present invention relates to an electronic flash unit and more particularly to a means and method of rapidly charging capacitors used as a power source for photography flash lamps and the like and to a means for carefully and precisely controlling the voltage applied to the system.

In conventional flash units a power source is connected across a capacitor and the capacitor is charged to the level of the source voltage. When desired, the capacitor is then discharged through the flash lamp unit causing a brilliant flash of short duration with the brilliance of the flash dependent upon voltage on the capacitor and the other parameters of the circuit. After the flash is completed the capacitor is again recharged to a selected level. Because the luminescence of the lamp should be accurately and uniformly controlled in order to obtain uniform and desired results, it is important to charge the capacitor to a consistent and precise level. Moreover, as these flash units may be used repeatedly within short intervals of time, it is also essential to provide a system in which the capacitor may be charged rapidly.

It is, therefore, an object of the present invention to provide a system in which a more rapid charge of a capacitor used to illuminate a flash lamp may be obtained.

It is also an object of the present invention to provide means for maintaining a precise voltage on the capacitor or capacitor banks when not being discharged through the lamp.

Further objects of the present invention include the provision of a simplified electronic circuit adapted to minimize the voltage required to maintain the capacitor at a selected level.

In the conventional system as described above, the voltage across the capacitor at any given time may be determined by the formula $V=E(1-e^{-t/RC})$ where E equals the source voltage, C equals the capacity of the capacitor or capacitors in microfarads, $t$ equals the time interval during which the source delivers charge to the condenser, and R equals the total impedance of the circuit including source impedance, circuit resistance and internal impedance of the capacitor.

It is clear, therefore, that in conventional design the capacitor will charge at an exponential rate in which the capacitor will charge to 63% of the source voltage in the first time constant, 63% of the remaining in its second time constant and so on, where the time constant is represented as RC. It will, therefore, take approximately five time constants for the voltage across the condenser to rise to substantially 100% of the source voltage. In order to reduce this time, it is necessary to make R as small as possible as the size of the capacitor C cannot be reduced without actually decreasing the light output of the unit. There is, however, a practical limitation beyond which the impedance cannot be reduced due to various factors which include size, cost, weight and the circuit impedance itself.

In order to effectively and further reduce the time during which the capacitor is charged to its maximum level, the present invention is designed to effectively increase the value of E, and in conjunction therewith utilizes a circuit in which the source of this charging voltage E is cut off at the specified rated level of the capacitor and the circuit is automatically cut into a precisely controlled alternate source of voltage designed to maintain the capacitor at a selected level. Under these circumstances in which E is materially increased, the voltage V will increase proportionately in such a manner that the capacitor will charge in a fraction of the time it would normally take with a conventional circuit.

Figure 3:
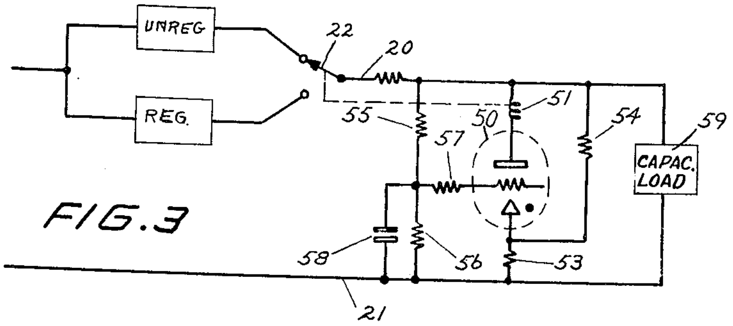
Figure 1:
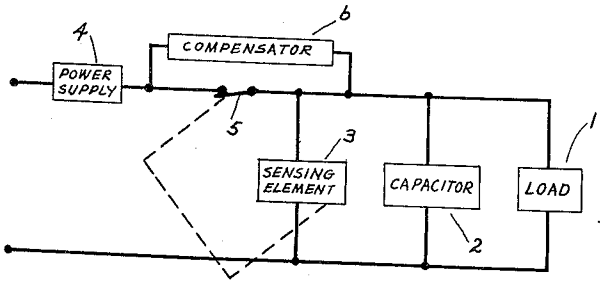
Figure 7:
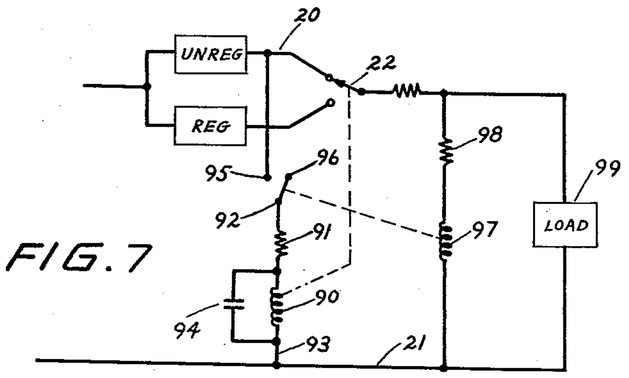
Figure 6:
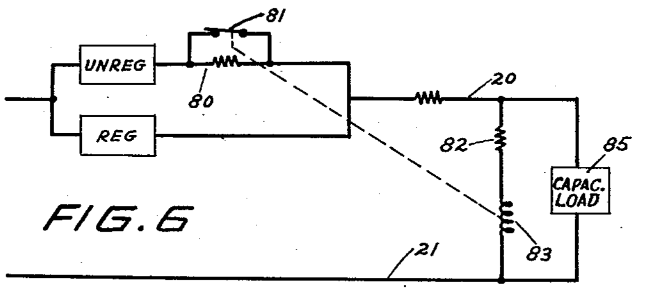
Figure 5:
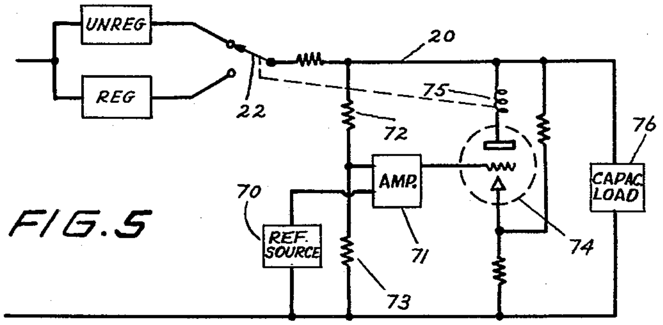
Figure 4:
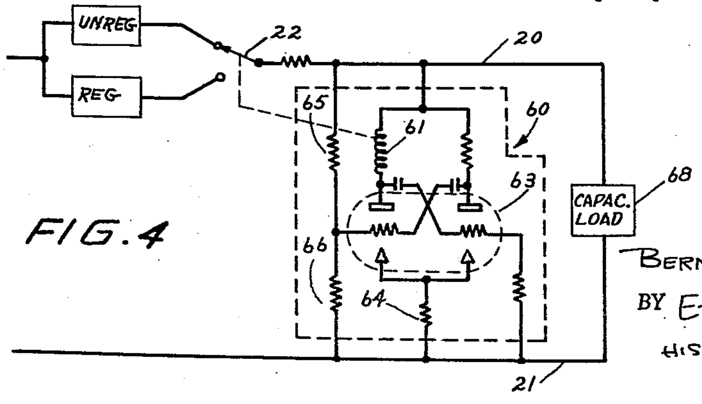

These and other objects and advantages of the present invention will be more clearly understood when considered in conjunction with the accompanying drawings in which FIGURE 1 is a schematic diagram of one embodiment of the invention, FIGURE 2 is a detailed schematic preferred embodiment of the invention, FIGURE 3 is a schematic embodiment of the modification of the invention, FIGURE 4 is a schematic embodiment of another modification of the invention, FIGURE 5 is a schematic embodiment of another modification of the invention, FIGURE 6 is a schematic embodiment of another form of the invention, and FIGURE 7 is a schematic embodiment of another form of the invention.

Referring first to FIGURE 1, there is illustrated a circuit of one form of the invention. In this arrangement the load 1 comprising the flash lamp is connected in parallel with a capacitor or bank of capacitors 2 and in parallel with a sensing element 3. A power supply source 4 is connected in series with a switch 5 in turn connected in series with the elements 1, 2 and 3. A compensator 6 is connected across the terminals of the switch 5 and between the terminals of the elements 2 and 3. The sensing element 3 may be a relay which operatively controls the switch 5. The compensator 6 may be a resistance having a high value. The power supply source 4 may be of conventional design providing a voltage in excess of the peak A.-C. voltage to which condenser 2 could charge if directly coupled to a conventional A.-C. line.

When the potential on capacitor 2 is below a prescribed normal potential, the sensing element 3 maintains switch 5 closed and over-volted power supply 4 then charges the capacitor 2 to said normal potential. As the power supply 4 provides an output voltage greatly in excess of this normal potential, capacitor 2 is charged thereto in much less time than would be required if the voltage of the source were the same as said normal potential.

When capacitor 2 is charged to this potential, the sensing element 3 causes the switch 5 to open, thereby allowing a current to flow to the capacitor only through the compensator 6. As the compensator 6 comprises preferably a resistor of high value, the current flowing through the compensator will be small and of a sufficient value to maintain the selected normal potential level on the capacitor 2. Switching in compensator 6 by opening switch 5 therefore maintains the voltage across the capacitor 2 at substantially the selected normal level once that level is attained.

A system according to the invention can be used to charge a capacitor to a rated value in one-fifth of the time that it takes for normal charging. Thus, assuming circuit parameters in which C equals 2000 mfd., R equals 5000 ohms and E equals 450 volts, on the basis of a ten second time constant (RC), the voltage level at various time intervals will be

| Time Constant: | | Voltage |
|---|---|---|
| First (10 seconds) | volts | 284 |
| Second (20 seconds) | do | 389 |
| Third (30 seconds) | do | 427½ |
| Fourth (40 seconds) | do | 442 |
| Fifth (50 seconds) | do | 450 |

If, however, an initial voltage E of 650 volts is applied across the capacitor on a circuit having the identical parameters the following voltages across the capacitor will result:

| Time Constant: | | Voltage |
|---|---|---|
| First (10 seconds) | volts | 410 |
| Second (20 seconds) | do | 560 |
| Third (30 seconds) | do | 616½ |
| Fourth (40 seconds) | do | 638 |
| Fifth (50 seconds) | do | 650 |

Thus, where a power supply is utilized, as in the present invention, with the voltage being in the nature of 1½ times greater than the prescribed normal voltage, a time saving of approximately one to five may be obtained in charging the capacitor 2 to a level of 450 volts. Obviously other parameters may be selected which could also be operative to vary the time constant as desired.

Referring now to FIGURE 2, there is shown a preferred embodiment of the invention. In this arrangement, line power is supplied from a conventional source such as the wall outlet 10 across the primary of the isolating transformer 11 through the lines 12, 13. If desired, a signal lamp 14 may be connected across the lines 12, 13. A fuse 15 is in series with the line 13 and a master control switch 16 is in series with the line 12. The secondary of the isolating transformer is connected with a voltage amplifier such as the voltage quadrupler 17. This conventional quadrupler may provide, as for example, an output of 600 volts across its output terminals 18, 19. Connected to the terminals 18, 19 are parallel lines 20, 21, respectively. A switch 22 and contact 23 are connected in series with the line 20 with the contact 24 connected to the line 25. Switch 22 is adapted to close between contacts 23, 24. The line 25 is connected in series with the voltage regulator generally designated 27, in turn connected in series with the line 26, with the line 26 connected to the terminal 18 at its other end. When the switch 22 contacts the contact or terminal 23, power is applied across the lines 20, 21 directly from the voltage quadrupler but when the switch is connected to the contact 24, the power from the quadrupler is applied across lines 20, 21 through the voltage regulator 27. This voltage regulator 27 may be of conventional design and of a nature such as shown but not specifically described within the dotted outline 27.

A sensing relay 30 operatively controls the switch 22 with this relay being electrically connected across lines 20, 21. This sensing relay may comprise the coil and armature 31, which when energized closes the arm 22 to contact 24, in series with a variable resistor 32. A capacitor 34 is connected across the lines 20, 21 with a switch and contact 35, 36 in series with capacitor 34. A second contact 37 is connected between coil 31 and variable resistor 32 with the switch 35 adapted to close to either the contact 36 or 37. The capacitor load 38 is connected across the lines 20, 21 and may comprise either a single condenser or a series of parallelly arranged condensers. Also connected across the lines 20, 21 is a load in the form of a flash lamp and if desired a safety switch. The load may conventionally be connected to the lines 21, 20 through a cord and socket arrangement. The voltage regulator 27 is connected on its low side by the line 40 to the line 21 at the connection of the capacitive load 38 to the line 21.

In the operation of this device, as illustrated in FIGURE 2, power from the A.C. source 10 is supplied through the isolating transformer, which is utilized to minimize the hazard of shock, to the voltage quadrupler 17 which may as noted provide approximately 600 volts across the terminals 18, 19. When the capacitive load 38 has been discharged through the flash lamp load 41 and is again recharging, the sensing relay 30 has closed the switch 22 to the contact 23 and thus there is applied across the lines 20, 21 and consequently across the capacitive load 38, the full voltage of the over-volted power supply from the quadrupler 17. This D.C. voltage is substantially in excess of the normal voltage level maintained on the capacitive load 38 which, for example, may be in the nature of 450 volts. When the voltage across the capacitor reaches the desired level and which may be predetermined by adjusting the resistor 32, the sensing relay 30 will actuate causing the switch 22 to close from the contact 23 to the contact 24. Under these circumstances, the power from the voltage quadrupler 17 is applied to the lines 20, 21 through the regulated voltage means 27 which may, as desired, be selected at 450 volts. The relay voltage for operating the switch 22 and the regulating voltage should be selected at a value as close together as possible. This may be obtained by proper selections of the resistors 42 and 43 in the voltage regulator 27.

It will be noted that when the switch 22 closes from the contact 23 to the contact 24, there is a short period of time during which moving contact arm is intermediate the contacts 23 and 24. In order to maintain a voltage across the sensing relay coil 31 and avoid sparking, the capacitor 34 is discharged across this coil 31. The capacitor 34 was previously charged through the contact arm 35 and contact 36 when the over-volted power supply was connected across the lines 20, 21. The sensing relay 30 may thus be used to actuate arm 35 through its limited distance of travel toward the contact 37 before actuating the contact arm 22. Thus, this capacitor 34 will provide voltage across the coil 31 to maintain the relay energized until a circuit is closed through the regulated power source.

When the flash lamp is fired, the voltage across the capacitor and sensing device 30 rapidly decreases to a point where the relay coil 31 again operates to move the contact arm 22 to contact 23, thus again completing the desired cycle.

The rapid recycling time obtainable by circuits of this type are in the nature of six seconds. It also should be particularly noted that the circuit herein described is a relatively low voltage system in which the voltage across the capacitor after it has been charged to its normal voltage and the voltage of the power supply source is normally in the range of perhaps 450 volts.

The embodiment as illustrated in FIGURE 2 discloses one means of providing a sensing element which controls the operating relay and switch 22. It is important, however, in some instances to provide a sensing system which is more precise in its control of the switching from the unregulated to the regulated power supply.

In FIGURE 3 a controlled thyratron tube 50 is connected across the lines 20, 21 with the coil of the relay 51 connected to the plate of the thyratron. The relay 51 controls the contact arm 22. The thyratron tube 50 is connected across the lines 21, 20 in series with the coil 51 and the resistor 53. A resistor 54 is connected across the line 20 and the cathode of the thyratron 50. Resistors 55 and 56 connected in series across the lines 20, 21 are center tapped to the grid of the thyratron through the resistor 57. A capacitor 58 is connected across the resistor 56. The load 59 is connected across the lines 20, 21. In the operation of this particular circuit, the thyratron tube 50 is biased by the resistor combination 53, 54 which causes the voltage on the cathode of the thyratron to rise above the voltage on the grid to prevent firing. By properly selecting the parameters of the resistors 55 and 56 and capacitor 58, the grid voltage on the thyratron may build up until at a specific voltage, the thyratron will fire. This will actuate the relay 51 and will cause the contact arm 22 to move from the unregulated to the regulated power supply source. This particular arrangement is more precise than that described in conjunction with FIGURE 2. However, there is some variation in the critical grid control of the thyratron itself.

Another and more precise method of control is illustrated in FIGURE 4. This particular modification utilizes a cathode coupled multivibrator 60 connected between the lines 20, 21. In this circuit, the relay coil 61 is connected to one-half of the tube 63 with that half of the tube biased to cut-off by the resistor 64. At a predetermined voltage determined by the resistors 65, 66 the tube 63 conducts through the relay coil 61 thus actuating the contact arm 22 and throwing it from the unregulated to the regulated power supply. This particular arrangement provides a precise control of the voltage across the load 68.

In FIGURE 5 there is shown one more means for sensing cut-off voltage at a precisely desired point. In this arrangement a stabilized voltage reference is utilized for comparison purposes with the voltage as it builds up across the capacitive load. In this arrangement a reference source of voltage obtained by suitable means at 70, such as a voltage reference tube, is fed into an amplifier 71 together with a voltage whose level is determined by the resistors 72, 73, connected in series across the lines 20, 21. The differential amplifier 71 controls the thyratron tube 74, being connected to the grid of that tube. A relay coil 75 controlling the switch 22 is connected to the thyratron and when the thyratron is fired at a voltage controlled by the amplifier 71, the relay coil 75 will actuate the contact 22, closing it from the unregulated power supply to the regulated power supply, thus a carefully regulated voltage across the load 76 may be maintained after the capacitor in this load has received its proper and desired charge.

In FIGURE 2, it will be noted there was described an arrangement which included means by which a capacitor 34 was adapted to be connected across the coil 31. The purpose of this type of arrangement is to assure proper operation of the switch arm 22 by maintaining a voltage across the relay coil when the arm is travelling between the unregulated power supply. Alternate means are provided which may obtain the same desired results. Such structure is, for example, included in the arrangement generally described in FIGURE 1, in which power is always supplied across the sensing element through the compensator 6. Such an arrangement is shown in further detail in FIGURE 6. In this arrangement the unregulated and regulated power supplies are connected in parallel with a resistor 80 having a high resistance value in series with the unregulated power supply source. A contact arm 81 is connected in parallel with this resistor 80 and in series with the unregulated power supply. Connected across the lines 20, 21 are a limiting resistor 82 and the coil 83 which actuates and operates the arm 81. When the load 85 containing the capacitor is being charged, the switch across the resistor 80 is closed, allowing the unregulated power supply to provide most of the charging current to the load. When the cut-off point is reached, the relay coil 83 opens arm 81. Current from the unregulated power supply is then effectively removed due to the large value of the resistance 80 and the regulated power supply is then impressed across the load.

A still further modification of this arrangement is shown in FIGURE 7. In this arrangement, the contact arm 22 is adapted to be connected selectively in series with the unregulated or regulated power supply source. Connected across the lines 20, 21 between the unregulated power supply and the contact arm 22 in series are the relay coil 90, resistor 91, contact arm 92 and line 93. A capacitor 94 is connected in parallel with the relay coil 90, while the contact arm 92 is adapted to close the line 93 to the contact 95 or open it to position 96. Also connected across the lines 20, 21 is the relay coil 97 and the resistor 98 in series wtih it. The load 99 which includes a capacitor adapted to charge for subsequent discharge through a flash bulb, is connected in a manner as previously indicated. In the operation of this particular circuit, when the charging cycle begins, the coil 97 is actuated at a selected voltage causing the arm 92 to close to the contact 95. This occurs in a voltage preferably about 20 volts lower than the selected voltage to which the load is to be charged. When the contact arm 92 closes to the contact 95, and the coil 90 is thereby actuated, the arm 22 will move from the unregulated to the regulated power supply contact.

Having now described my invention, I claim:

1. A system for rapidly charging and maintaining a voltage level across a capacitive means independent of the capacitive means characteristics adapted to be intermittently discharged, comprising means for charging said capacitive means at an exponential rate toward a desired voltage and means for maintaining the charge on said capacitive means when it has reached substantially said desired voltage comprising a source voltage substantially equal to said desired voltage and means for selectively electrically disengaging said means for charging and connecting said means for maintaining the charge to said capacitive means when said capacitive means has reached said desired voltage.

2. A system as set forth in claim 1 wherein said means for maintaining the charge comprises a compensator in series with said means for charging adapted to reduce the source voltage passing through said compensator to substantially said desired voltage and said means for disengaging includes a switch in shunt with said compensator adapted to open when said capacitive means has reached said desired voltage.

3. A system as set forth in claim 1 wherein said means for disengaging includes a relay having a coil connected substantially in parallel with said capacitive means and a switch arm in series with said capacitive means operative when said desired voltage is impressed across said coil and adapted to be switched thereby from said means for charging to said means for maintaining the charge.

4. A system as set forth in claim 1 wherein said means for maintaining the charge includes a voltage regulator for precisely controlling the level of said desired voltage.

5. A system as set forth in claim 3 wherein means are provided for maintaining substantially said desired voltage across said coil when said switch arm is being actuated.

6. Apparatus for rapidly charging a capacitor to a selected voltage level and maintaining it there, comprising a first source of an output voltage substantially in excess of said selected voltage level, a second source of an output voltage substantially equal to said selected voltage level, and means dependent on the voltage level of said capacitor to effectively transfer the latter from said first source to said second source during the charging period.

7. Apparatus for rapidly charging a capacitor to its rated voltage level and maintaining it there, comprising a first source of unregulated voltage substantially in excess of said rated voltage level, a second source of regulated voltage substantially equal to said related voltage level, and switching means dependent on the voltage level of said capacitor to effectively transfer the latter from said first source to said second source during the charging period.

8. Apparatus for rapidly charging a capacitor to its rated voltage level and maintaining it there, comprising first means adapted to apply a voltage to said capacitor substantially in excess of said rated level, second means adapted to apply a voltage to said capacitor substantially equal to said rated level, means for sensing the voltage level of said capacitor, and switching means actuated by said sensing means adapted to transfer said capacitor from said first means to said second means during said charging period.

9. The apparatus of claim 8 wherein means are provided for maintaining a voltage across said sensing means during the transfer of said capacitor by switching.

10. The apparatus of claim 8 and further comprising additional switching means for maintaining a connection during said charging period between said capacitor and one of said means for applying a voltage thereto.

11. The apparatus of claim 8 wherein said first and second means for applying a voltage respectively comprise unregulated and regulated power sources.

12. The apparatus of claim 11, and further comprising means for maintaining a connection during said charging period between said capacitor and one of said means for applying a voltage thereto.

13. The apparatus of claim 11 wherein said sensing means comprises a relay connected in series with an electron tube.

14. A system as set forth in claim 6, wherein said voltage dependent means includes a thyratron tube adapted to fire at a selected voltage with a relay controlling said connecting means electrically coupled to the plate of said tube.

15. A system as set forth in claim 6, wherein said voltage dependent means includes a cathode coupled multivibrator adapted to actuate said means for connecting said capacitive means.

16. Apparatus for rapidly charging a capacitive load to a prescribed voltage level comprising, a first terminal normally maintained at a potential much greater than said prescribed voltage level, a second terminal normally maintained at said prescribed voltage level, and switching means responsive to the potential across said capacitive load for selectively connecting said first terminal to said load while the voltage thereacross is less than said prescribed voltage level and connecting said second terminal to said load after said level is attained to normally maintain said capacitive load charged to said prescribed voltage level.

References Cited in the file of this patent

UNITED STATES PATENTS

| | | |
|---|---|---|
| 2,102,883 | Bouwers | Dec. 21, 1937 |
| 2,250,102 | Klemperer | July 22, 1941 |
| 2,383,492 | Klemperer | Aug. 28, 1945 |
| 2,385,736 | Smith et al. | Sept. 25, 1945 |
| 2,468,080 | Klemperer | Apr. 26, 1949 |
| 2,771,575 | Hampton | Nov. 20, 1956 |
| 2,891,209 | Schalk | June 16, 1959 |